US012602019B2

(12) United States Patent
Fujimoto et al.

(10) Patent No.: US 12,602,019 B2
(45) Date of Patent: Apr. 14, 2026

(54) COMPUTATIONAL MODEL OF REFERENCE RESPONSE PROFILE

(71) Applicants: The University of Tokyo, Tokyo (JP); KABUSHIKI KAISHA YASKAWA DENKI, Kitakyushu (JP)

(72) Inventors: Hiroshi Fujimoto, Tokyo (JP); Ryohei Kitayoshi, Fukuoka (JP)

( * ) Notice: Subject to any disclaimer, the term of this patent is extended or adjusted under 35 U.S.C. 154(b) by 525 days.

(21) Appl. No.: 18/173,781

(22) Filed: Feb. 24, 2023

(65) Prior Publication Data

US 2023/0195059 A1      Jun. 22, 2023

Related U.S. Application Data

(63) Continuation of application No. PCT/JP2020/032901, filed on Aug. 31, 2020.

(51) Int. Cl.
G05B 13/04 (2006.01)

(52) U.S. Cl.
CPC ................................. G05B 13/042 (2013.01)

(58) Field of Classification Search
CPC ................ A61B 3/102; G01B 2290/70; G01B 9/02059; G01B 9/02091; B25J 9/10; G05B 13/042
See application file for complete search history.

(56) References Cited

U.S. PATENT DOCUMENTS

| | | | |
|---|---|---|---|
| 5,859,774 A | 1/1999 | Kuzuya et al. | |
| 6,250,419 B1 * | 6/2001 | Chabaan ................. | B62D 6/10 |
| | | | 180/443 |

(Continued)

FOREIGN PATENT DOCUMENTS

| | | |
|---|---|---|
| JP | H9-269804 | 10/1997 |
| JP | H10-091211 | 4/1998 |

(Continued)

OTHER PUBLICATIONS

International Search Report dated Nov. 17, 2020 for PCT/JP2020/032901.

(Continued)

*Primary Examiner* — Tameem D Siddiquee
(74) *Attorney, Agent, or Firm* — SHIPWAY IP

(57) ABSTRACT

A control system includes a storage that stores a computational model of a reference response profile representing a frequency characteristic of a reference state of a control target corresponding to a first command, and circuitry configured to calculate a first actual response profile representing a frequency characteristic of an actual state of the control target having responded to the first command. The circuitry is further configured to acquire an error between the reference response profile and the first actual response profile, and cause a controller to output, to the control target, a second command that is based on a frequency at which the error is greater than a threshold. Additionally, the circuitry is configured to calculate a second actual response profile representing a frequency characteristic of an actual state of the control target having responded to the second command, and update the computational model based on the second actual response profile and the reference response profile.

18 Claims, 7 Drawing Sheets

(56) References Cited

U.S. PATENT DOCUMENTS

| | | | | |
|---|---|---|---|---|
| 7,706,899 | B2 * | 4/2010 | El Rifai | G05B 13/02 |
| | | | | 700/42 |
| 2003/0028266 | A1 * | 2/2003 | Jacques | G05B 5/01 |
| | | | | 700/32 |
| 2003/0033058 | A1 | 2/2003 | Lund | |
| 2010/0049337 | A1 * | 2/2010 | Sakagami | G05B 19/058 |
| | | | | 700/32 |
| 2012/0296471 | A1 * | 11/2012 | Inaba | B25J 9/1694 |
| | | | | 901/42 |
| 2016/0313726 | A1 * | 10/2016 | Iijima | G05B 19/416 |
| 2018/0236657 | A1 | 8/2018 | Kuwahara et al. | |

FOREIGN PATENT DOCUMENTS

| | | |
|---|---|---|
| JP | 2009-134751 | 6/2009 |
| JP | 2010-182186 | 8/2010 |
| JP | 2018-134703 | 8/2018 |

OTHER PUBLICATIONS

International Preliminary Report on Patentability with Written Opinion dated Mar. 9, 2023 for PCT/JP2020/032901.

* cited by examiner

*Fig.3*

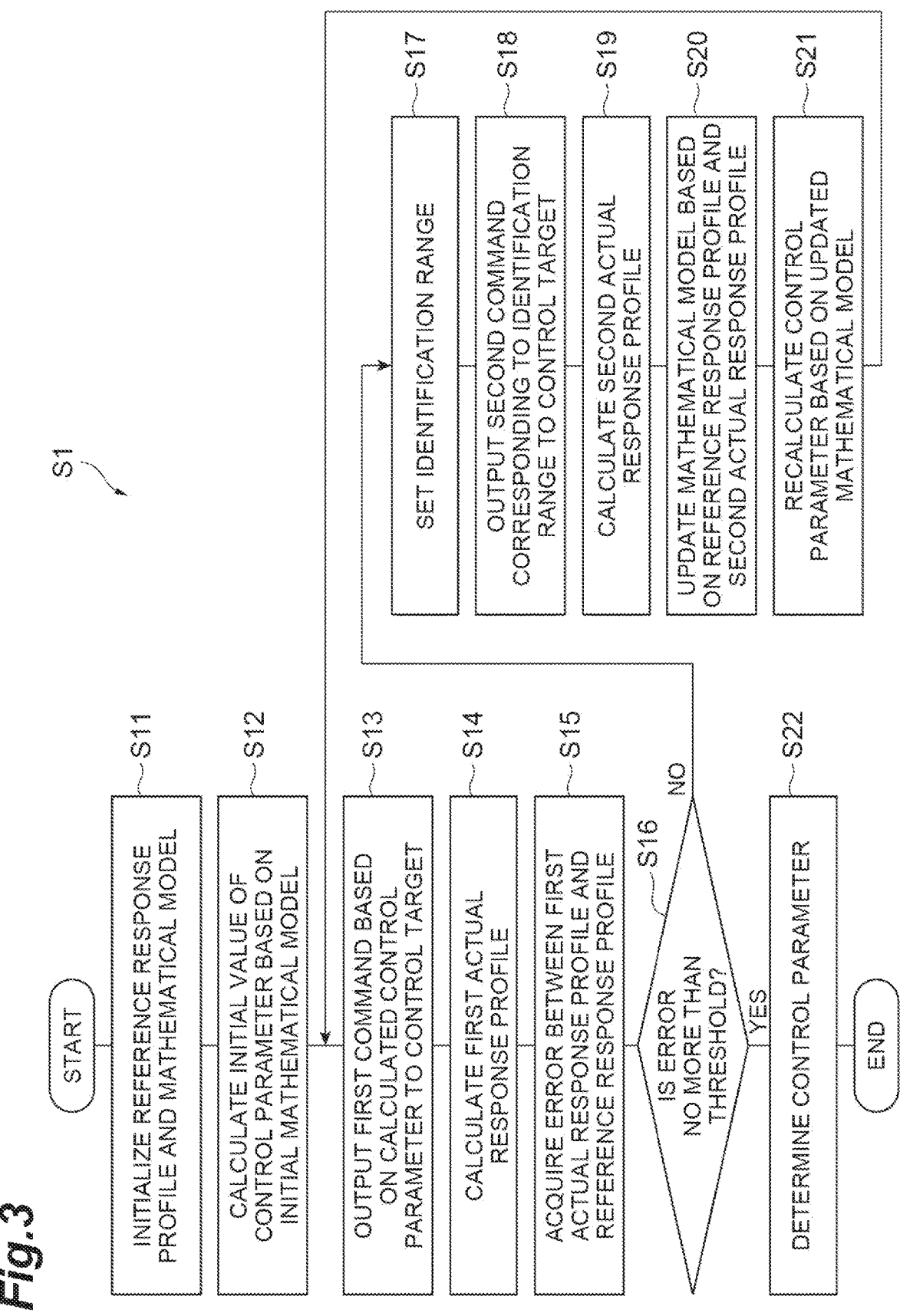

START

INITIALIZE REFERENCE RESPONSE PROFILE AND MATHEMATICAL MODEL ~S11

CALCULATE INITIAL VALUE OF CONTROL PARAMETER BASED ON INITIAL MATHEMATICAL MODEL ~S12

OUTPUT FIRST COMMAND BASED ON CALCULATED CONTROL PARAMETER TO CONTROL TARGET ~S13

CALCULATE FIRST ACTUAL RESPONSE PROFILE ~S14

ACQUIRE ERROR BETWEEN FIRST ACTUAL RESPONSE PROFILE AND REFERENCE RESPONSE PROFILE ~S15

IS ERROR NO MORE THAN THRESHOLD? ~S16

NO

SET IDENTIFICATION RANGE ~S17

OUTPUT SECOND COMMAND CORRESPONDING TO IDENTIFICATION RANGE TO CONTROL TARGET ~S18

CALCULATE SECOND ACTUAL RESPONSE PROFILE ~S19

UPDATE MATHEMATICAL MODEL BASED ON REFERENCE RESPONSE PROFILE AND SECOND ACTUAL RESPONSE PROFILE ~S20

RECALCULATE CONTROL PARAMETER BASED ON UPDATED MATHEMATICAL MODEL ~S21

YES

DETERMINE CONTROL PARAMETER ~S22

END

S1

*Fig.5*
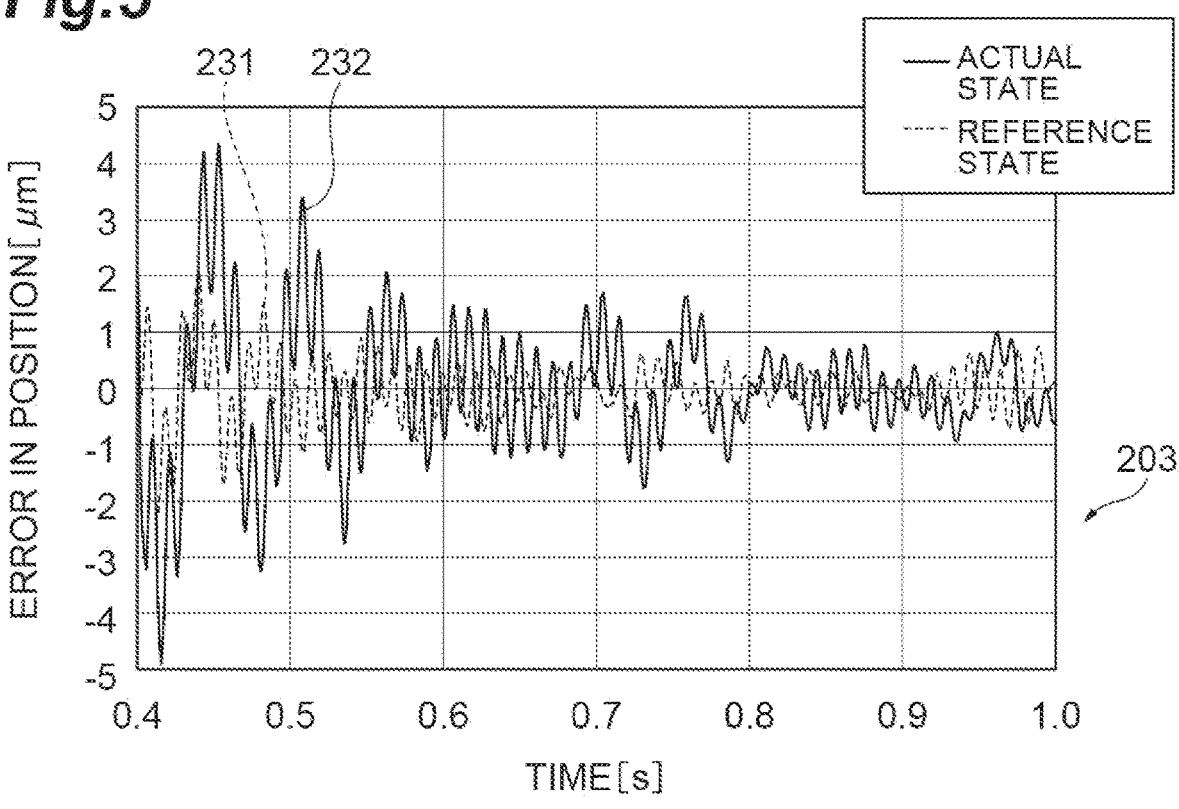
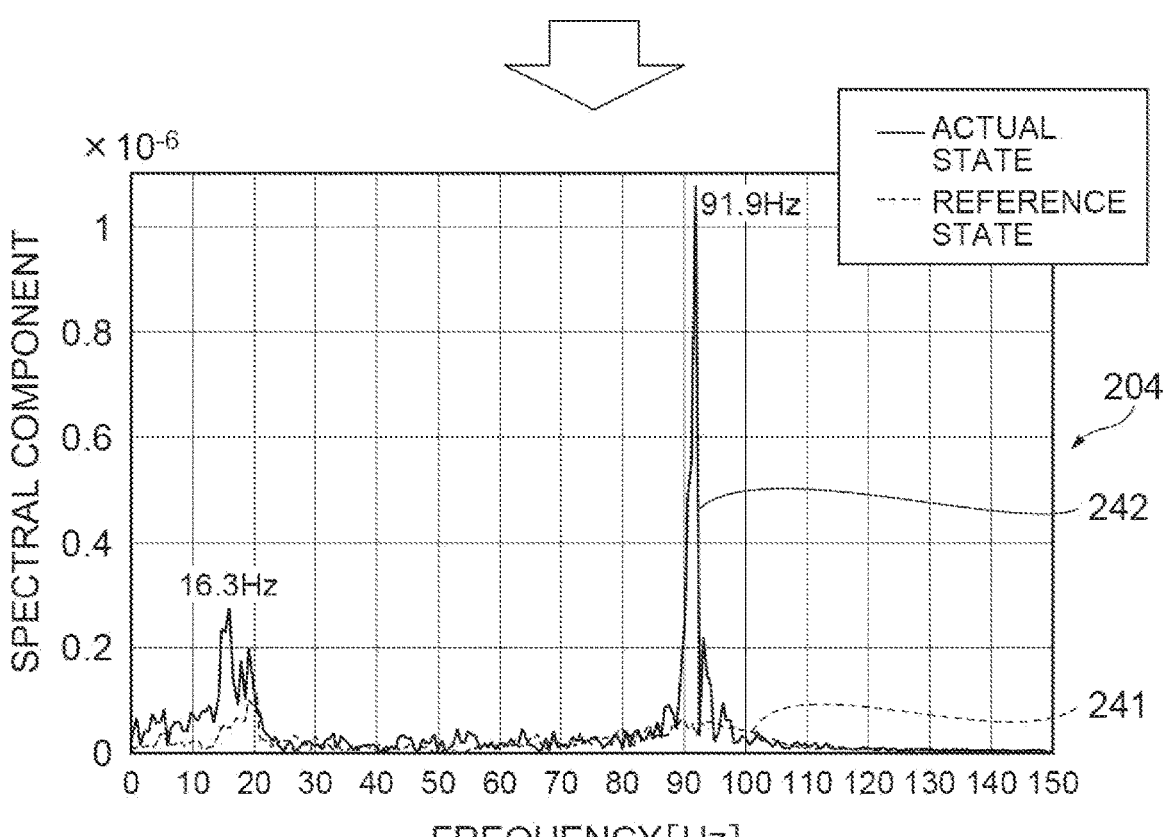

COMPUTATIONAL MODEL OF REFERENCE RESPONSE PROFILE

CROSS-REFERENCE TO RELATED APPLICATIONS

This application is a continuation application of PCT Application No. PCT/JP2020/032901, filed on Aug. 31, 2020. The entire contents of the above listed PCT and priority applications are incorporated herein by reference.

BACKGROUND

Field

The present disclosure relates to a control system, a control method, a computer, and a control program.

Description of the Related Art

Japanese Unexamined Patent Application Publication No. 2018-134703 describes a robot simulator including a model storage unit that stores model information related to a robot and an obstacle, and an information processing unit that generates a path capable of moving a tip portion of the robot from a start position to an end position based on the model information while avoiding collision between the robot and the obstacle.

SUMMARY

A control system according to an aspect of the present disclosure includes: a controller configured to output a command to a control target; a storage configured to store a computational model of a reference response profile representing, as a reference frequency characteristic, a frequency characteristic of a reference state of the control target corresponding to a first command; and circuitry configured to: calculate a first actual response profile representing, as a first frequency characteristic, a frequency characteristic of a first actual state of the control target having responded to the first command; acquire an error between the reference response profile and the first actual response profile; cause the controller to output, to the control target, a second command that is based on a frequency at which the error is greater than a predetermined threshold; calculate a second actual response profile representing, as a second frequency characteristic, a frequency characteristic of a second actual state of the control target having responded to the second command; and update the computational model based on the second actual response profile and the reference response profile.

A control method according to an aspect of the present disclosure is executable by a control system including a controller configured to output a command to a control target. The method includes: storing, into a storage, a computational model of a reference response profile representing, as a reference frequency characteristic, a frequency characteristic of a reference state of the control target corresponding to a first command; calculating a first actual response profile representing, as a first frequency characteristic, a frequency characteristic of a first actual state of the control target having responded to the first command; acquiring an error between the reference response profile and the first actual response profile; causing the controller to output, to the control target, a second command that is based on a frequency at which the error is greater than a predetermined threshold; calculating a second actual response profile representing, as a second frequency characteristic, a frequency characteristic of a second actual state of the control target having responded to the second command; and updating the computational model based on the second actual response profile and the reference response profile.

A non-transitory computer-readable storage medium according to an aspect of the present disclosure stores processor-executable instructions to: store, into a storage, a computational model of a reference response profile representing, as a reference frequency characteristic, a frequency characteristic of a reference state of a control target corresponding to a first command; calculate a first actual response profile representing, as a first frequency characteristic, a frequency characteristic of a first actual state of the control target having responded to the first command; acquire an error between the reference response profile and the first actual response profile; cause a controller to output, to the control target, a second command that is based on a frequency at which the error is greater than a predetermined threshold; calculate a second actual response profile representing, as a second frequency characteristic, a frequency characteristic of a second actual state of the control target having responded to the second command; and update the computational model based on the second actual response profile and the reference response profile.

BRIEF DESCRIPTION OF THE DRAWINGS

FIG. 3 is a flowchart showing an example operation of the control system.

FIG. 5 is a diagram showing an example error between response profiles.

DETAILED DESCRIPTION

Figure 1:
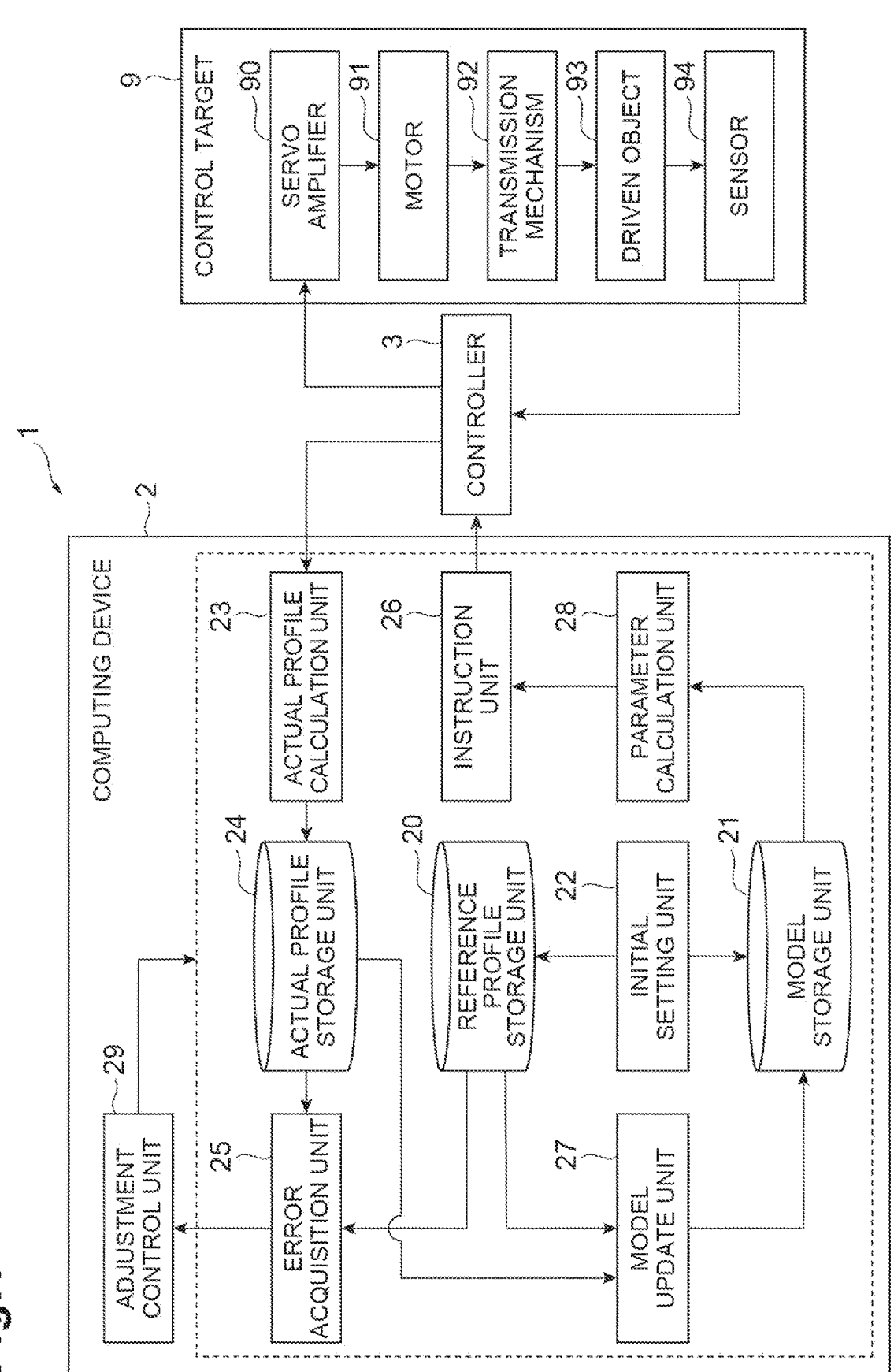
FIG. 1 is a diagram showing an example configuration of a control system.

In the following description, with reference to the drawings, the same reference numbers are assigned to the same components or to similar components having the same function, and overlapping description is omitted.

Overview of System

A control system 1 according to an aspect of the present disclosure includes a controller 3 that outputs a command signal to a control target 9. The control target refers to a device that performs a predetermined operation according to a purpose to perform useful work. The control target may be referred to as "target device". The control target can also be referred to as a machine. Examples of the control target 9 include any type of robot and any type of machine tool. The control system 1 can be used to control any control target.

The command signal refers to a data signal indicating a command that is an instruction for controlling the control target 9. The control target 9 operates based on the command signal output from the controller 3. Examples of the command signal include a position command and a velocity command.

The controller 3 generates the command signal based on a previously generated control parameter, and controls the control target 9 with the command signal. The control parameter refers to a variable that defines a relationship between a command to the control target 9 and an amount of control for causing the control target 9 to follow the command. Examples of the relationship between the command and the amount of control include a relationship between the position command or the velocity command for a driven object and a driving force command for a motor. The driving force command is an example of the amount of control.

The control parameter is adjusted based on characteristics of the control target 9 prior to operating the controller 3. However, since the characteristics of the control target 9 may change over time, the control parameter may be readjusted to match the change in the characteristics. Also, in a case where a measurement result includes an error when measuring the characteristics of the control target 9, the control parameter may be adjusted based on the erroneous characteristics, and as a result, an error may occur in the operation of the control target 9.

The control system 1 identifies the characteristics of the control target 9 more accurately and automatically executes a process to adjust the control parameter based on the identified characteristics. Since the control parameter is automatically adjusted by that mechanism, commands may continue to be output to the control target 9 even if the characteristics of the control target 9 change over time or an error occurs in the initial measurement of the characteristics. As a result, the control target 9 can continue to operate properly. By automatically adjusting the control parameter, the time and cost required to adjust the controller 3 can be saved because a worker does not need to go to a field to adjust the controller 3. In addition, a user who does not have expert knowledge can continue to operate the controller 3 and the control target 9 properly.

Configuration of System

FIG. 1 is a diagram showing an example configuration of the control system 1 according to some examples. The control system 1 is connected to the control target 9. FIG. 1 shows one the control target 9. However, the control system 1 may be connected to a plurality of the control targets 9.

In some examples, the control target 9 comprises a servo amplifier 90, a motor 91, a transmission mechanism 92, a driven object 93, and a sensor 94. The driven object 93 may have any shape, any structure, and any size. One or more motors 91 may be used, and the motor 91 may have any size. Hereinafter, the control target 9 in which one motor 91 is provided and the driven object 93 is one rigid body will be shown.

The servo amplifier 90 is a device for causing the output of the motor 91 to follow the command signal from the controller 3. In some examples, the servo amplifier 90 generates electric power to move the motor 91 based on the command signal and supplies the electric power to the motor 91. The supplied electric power corresponds to the driving force command such as a torque command, a current command, or the like.

The motor 91 is a device that generates power for driving the driven object 93 in response to the supply of electric power. The motor 91 may be a rotary motor that rotates the driven object 93, or a linear motor that moves the driven object 93 along a straight line. The motor 91 may be a synchronous motor or may be an induction motor. The motor 91 may be a permanent magnet-type synchronous motor such as a surface permanent magnet (SPM) motor or an interior permanent magnet (IPM) motor. The motor 91 may be a synchronous motor that does not have permanent magnets, such as a synchronous reluctance motor.

The transmission mechanism 92 is a component that transmits velocity of an output shaft of the motor 91 to the driven object 93. The transmission mechanism 92 is, for example, a reducer configured such that velocity of the driven object 93 is lower than velocity of an output shaft of the motor 91. For example, the transmission mechanism 92 includes a plurality of gears that transmit power from the motor 91 to the driven object 93 at a predetermined reduction ratio.

The sensor 94 is a device that detects a response value of the control target 9 corresponding to the command. The response value refers to a physical quantity indicating the state (i.e., response) of the control target 9 with respect to the command. Examples of the response value include at least one of a position and velocity of the driven object 93. In a case where the motor 91 is a rotation type, the rotation angle of the driven object 93 by the motor 91 corresponds to the "position", and the rotation velocity of the driven object 93 by the motor 91 corresponds to the "velocity". Further, torque corresponds to the driving force. Examples of the sensor 94 include a rotary encoder that outputs a pulse signal having a frequency proportional to operating velocity of the driven object 93. The rotary encoder is able to acquire both the position and velocity of the driven object 93.

The control system 1 includes a computing device 2 and the controller 3. The computing device 2 is a computer that calculates the control parameter. The controller 3 is a device that outputs a command signal based on the control parameter to the control target 9. In some examples, the controller 3 outputs a command signal (e.g., position command, velocity command, etc.) indicating a command related to the driving force to be generated in the motor 91, to the servo amplifier 90. In some examples, the computing device 2 is a computer with higher performance than the controller 3. For example, the computing device 2 may be implemented by a general-purpose computer such as a personal computer, a business server, a mobile terminal, or the like. Alternatively, the computing device 2 may be implemented by a dedicated device, such as a programmable logic controller.

As shown in FIG. 1, the computing device 2 includes a reference profile storage unit 20, a model storage unit 21, an initial setting unit 22, an actual profile calculation unit 23, an actual profile storage unit 24, an error acquisition unit 25, an instruction unit 26, a model update unit 27, a parameter calculation unit 28, and an adjustment control unit 29 as functional modules.

The reference profile storage unit 20 is a functional module that stores a reference response profile. The reference response profile refers to a response profile of the control target 9 used as a reference when adjusting the control parameter. In the present disclosure, the response profile refers to information indicating a state of the control target 9 having responded to a command from the controller 3, and for example, refers to information indicating a frequency characteristic of the state. The frequency characteristic of the state of the control target 9 is obtained by converting a temporal change of the state of the control target 9 corresponding to a temporal change of the command into a frequency domain representation. The state of the control target 9 may be indicated by any data item, for example represented by at least one of position, posture, velocity, acceleration, torque, force, and current value. The response profile is obtained by a frequency analysis method. In some examples, the Fast Fourier Transform (FFT) is used as the frequency analysis method. The control system 1 may use another frequency analysis technique. The reference response profile represents a reference state of the control target 9 corresponding to the command.

The model storage unit 21 is a functional module that stores a computational or mathematical model used to calculate the control parameter. In some examples, the model storage unit 21 stores a mathematical model of the reference response profile. In the present disclosure, the computational/mathematical model refers to a computational or mathematical expression that expresses movement of the control target 9 based on the command from controller 3. The mathematical model may be represented by a single mathematical expression or by a combination of a plurality of mathematical expressions.

The initial setting unit 22 is a functional module that initializes the reference response profile and the mathematical model. As the initial setting, the initial setting unit 22 stores an initial reference response profile in the reference profile storage unit 20 and stores an initial mathematical model in the model storage unit 21.

The actual profile calculation unit 23 is a functional module that calculates an actual response profile. In the present disclosure, the actual response profile refers to a response profile representing an actual state of the control target having actually responded to the command from the controller 3, for example, refers to a response profile representing a frequency characteristic of the state. The actual profile calculation unit 23 receives a temporal change in the response values of the control target 9 from the controller 3 and calculates the actual response profile based on the received data.

The actual profile storage unit 24 is a functional module that stores the actual response profile calculated by the actual profile calculation unit 23.

The error acquisition unit 25 is a functional module that acquires an error between the reference response profile and the actual response profile. The error can be said to be an index indicating how far the actual response profile deviates from the reference response profile.

The instruction unit 26 is a functional module that causes the controller 3 to output a command signal to the control target 9. In some examples, the instruction unit 26 transmits control information that is used to generate the command signal, to the controller 3. The controller 3 generates the command signal based on the control information, and outputs the command signal to the control target 9.

The model update unit 27 is a functional module that updates the mathematical model stored in the model storage unit 21. In some examples, the model update unit 27 updates the mathematical model based on the reference response profile and the actual response profile.

The parameter calculation unit 28 is a functional module that recalculates the control parameter based on the updated mathematical model. The recalculated control parameter is transmitted from the instruction unit 26 to the controller 3 as at least part of the control information.

The adjustment control unit 29 is a functional module that repeatedly executes a series of processes including the update of the mathematical model and the recalculation of the control parameter, until an error between the reference response profile and the actual response profile becomes equal to or less than a predetermined threshold. In short, the adjustment control unit 29 repeats the process such that the control target 9 operates within an allowable error. In a case where the error exceeds the threshold, the adjustment control unit 29 causes the other functional modules to perform the iteration. In a case where the error is less than or equal to the threshold, the adjustment control unit 29 determines the control parameter.

Figure 2:
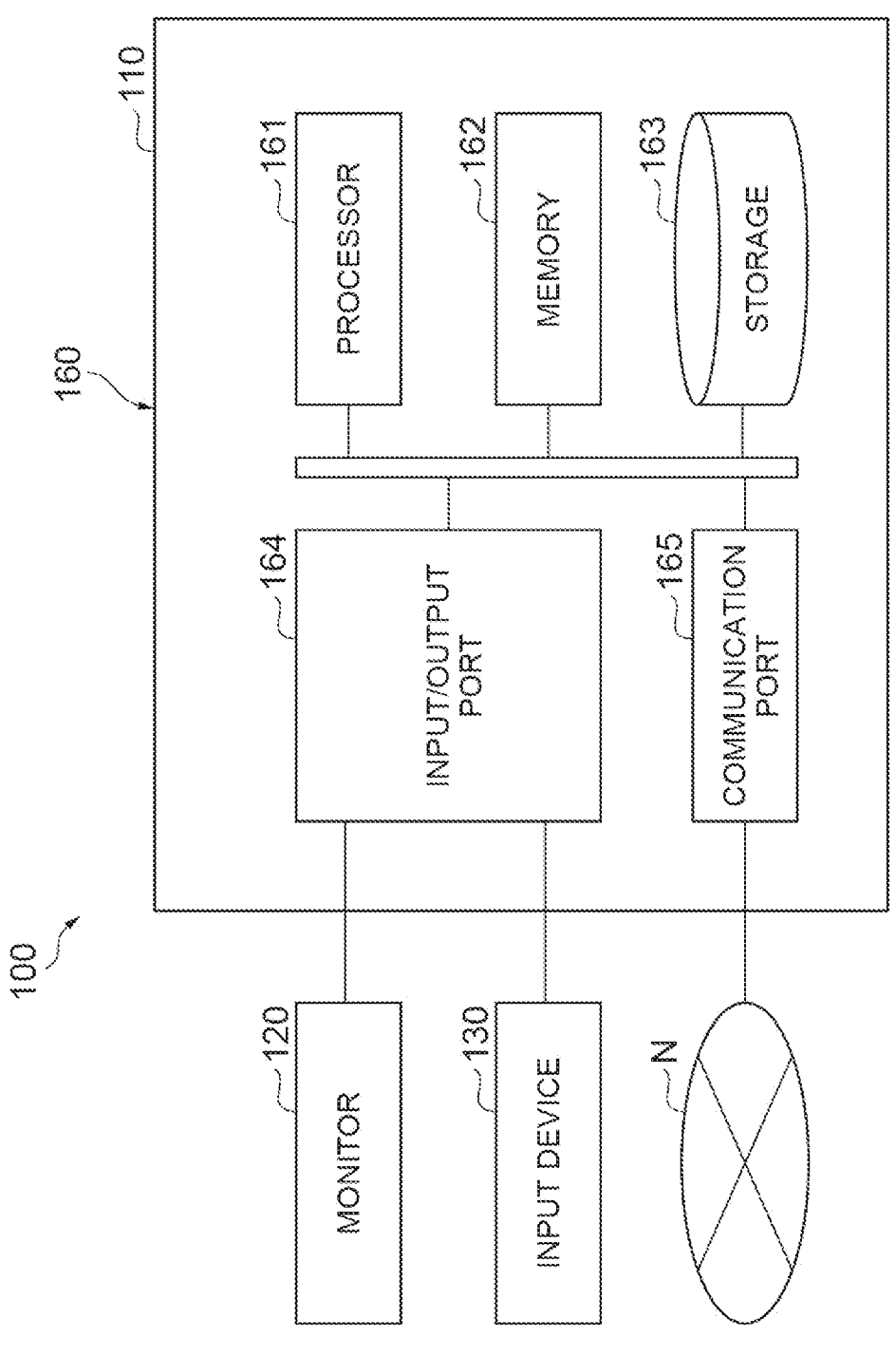
FIG. 2 is a diagram showing an example hardware configuration of a computer used in the control system.

FIG. 2 is a diagram showing an example hardware configuration of a computer 100 used in the control system 1. In this example, the computer 100 comprises a main body 110, a monitor 120, and an input device 130.

The main body 110 is a device that executes a main function of a computer. The main body 110 has circuitry 160, which has at least one processor 161, a memory 162, a storage 163, an input/output port 164, and a communication port 165. The storage 163 stores a program for configuring each functional module of the main body 110. The storage 163 is a computer-readable recording medium such as a hard disk, a nonvolatile semiconductor memory, a magnetic disk, or an optical disk. The memory 162 temporarily stores a program loaded from the storage 163, calculation results of the processor 161, and the like. The processor 161 realizes each functional module by executing the program in cooperation with the memory 162. The input/output port 164 inputs and outputs electrical signals to and from the monitor 120 or the input device 130 in response to commands from the processor 161. The input/output port 164 may input and output electrical signals to and from other devices. The communication port 165 performs data communication with other devices via a communication network N according to commands from the processor 161.

The monitor 120 is a device for displaying information output from the main body 110. The monitor 120 may include any type of device capable of displaying text or graphics. Examples of the monitor 120 include a liquid crystal panel.

The input device 130 is a device for inputting information to the main body 110. The input device 130 may be anything as long as information can be input. Examples of the input device 130 include operating interfaces such as a keypad, a mouse, and a manipulation controller.

The monitor 120 and the input device 130 may be integrated as a touch panel. The main body 110, the monitor 120, and the input device 130 may be integrated, like a tablet computer.

Control Method

As an example control method according to the present disclosure, an example processing procedures executed by the control system 1 will be described with reference to FIG. 3. FIG. 3 is a flowchart showing an example operation of the control system 1 as a processing flow S1. That is, the control system 1 executes the processing flow S1.

In step S11, the initial setting unit 22 initializes the reference response profile and the mathematical model. The initial setting unit 22 stores the initial reference response profile in the reference profile storage unit 20 and stores the initial mathematical model in the model storage unit 21.

In some examples, the initial setting unit 22 acquires time-series data (in the present disclosure, this data is also referred to as "time-series response data") of response values acquired from the control target 9 having actually responded to the command. The time-series response data discretely indicates a temporal change in the state of the control target 9. The initial setting unit 22 may calculate the initial reference response profile from actual time-series response data using the FFT. That is, the "reference state" of the control target 9 represented by the reference response profile may be represented by an actual state which is a result of actually operating the control target 9 (for example, an experimental result).

Alternatively, the initial setting unit 22 may operate the control target 9 on computer simulation to acquire the time-series response data, and use the FFT to calculate the initial reference response profile from the time-series response data. That is, the above-mentioned "reference state" may be represented by a virtual state calculated by the computer simulation.

Alternatively, the initial setting unit 22 may acquire the reference response profile that has already been prepared. For example, the initial setting unit 22 may accept the reference response profile input by a user, receive the reference response profile from another computer, or retrieve the reference response profile from another storage device such as a database.

The initial setting unit 22 stores the generated or acquired initial reference response profile in the reference profile storage unit 20. In some examples, the reference response profile discretely indicates the frequency characteristic of the state of the control target 9.

In some examples, the model storage unit 21 may acquire the initial mathematical model that has already provided along with the reference response profile, by user input, receipt from another computer, or access to a database. The initial setting unit 22 stores the acquired initial mathematical model in the model storage unit 21.

In another example, the initial setting unit 22 may generate the initial mathematical model. A command profile and the response profile are used to generate the mathematical model. The initial setting unit 22 executes the FFT on the temporal change of the command to the control target 9 to acquire the command profile. Also, the initial setting unit 22 uses the reference response profile as the response profile. Subsequently, the initial setting unit 22 calculates a response gain representing a relationship between an amplitude of the command profile and an amplitude of the response profile. For example, the response gain represents a ratio of the amplitude of the response profile to the amplitude of the command profile. Subsequently, the initial setting unit 22 generates a gain profile indicating a relationship between the frequency of the command and the response gain. The initial setting unit 22 then generates the mathematical model in which the frequency characteristic is fitted to the gain profile. It can be said that the fitting operation is based on the reference response profile. In some examples, the mathematical model may be a linear differential equation representing a relationship between an input function representing a relationship between elapsed time and input and an output function representing a relationship between elapsed time and output. The fact that "the frequency characteristic is fitted to the gain profile" refers to the fact that the frequency characteristic is approximated to the gain profile, and includes a case where the frequency characteristic matches the gain profile. The initial setting unit 22 may generate the initial mathematical model with any fitting technique. For example, the initial setting unit 22 may generate the initial mathematical model by least squares method, polynomial approximation, circle approximation, approximation by various functions (trigonometric function, B-Spline, etc.), or weighted sum of a plurality of functions. Alternatively, the initial setting unit 22 may generate the initial mathematical model based on a learned model generated by machine learning so as to express a relationship between the gain profile and the mathematical model. The initial setting unit 22 stores the generated initial mathematical model in the model storage unit 21 as the mathematical model of the reference response profile.

The initial setting unit 22 may generate a plurality of mathematical models. For example, the initial setting unit 22 may generate a mathematical model related to the gain profile and a mathematical model related to a phase profile as mathematical models of the reference response profile. The phase refers to a time delay of the response to the command.

In step S12, the parameter calculation unit 28 reads the initial mathematical model from the model storage unit 21, and calculates an initial value of the control parameter based on that mathematical model.

The control parameter corresponds to a configuration of the controller 3. The parameter calculation unit 28 may calculate the control parameter of feedback control or the control parameter of feedforward control. In some examples, the control parameter may include a gain indicating a relationship (e.g., an amplitude ratio) between input and output. Alternatively, the control parameter may include the type, number, and parameter of filters forming a basis filter for adjusting the frequency characteristic of the command. In some examples, the parameter calculation unit 28 may calculate a proportional gain, an integration gain, and a differential gain, which are control parameters in PID control. Alternatively, the parameter calculation unit 28 may calculate a gain in cascade control configured by a plurality of control loops. The gain in cascade control is, for example, a proportional gain, an integration gain, and a differential gain. Examples of the cascade control include P-PI control. The basis filter refers to a filter generated by combining a plurality of types of filters used to configure the control system. Examples of the filter used to configure the control system may include filters used to adjust gain and phase, such as a low-pass filter, a high-pass filter, a notch filter, a peak filter, an all-pass filter, phase-lead compensation, and phase-lag compensation.

In some examples, the parameter calculation unit 28 may perform the H∞ (H-infinity) control theory and an optimized calculation corresponding to the theory on the mathematical model to calculate the control parameter. The H∞ control theory is a method in which the magnitude of a transfer function of a closed-loop system is measured with the scale of the H∞ norm, and the norm is reduced to achieve target performance. As an example of the H∞ control theory, the parameter calculation unit 28 may use Structured H∞ control. Examples of the optimization calculation include Linear Matrix Inequality (LMI). The parameter calculation unit 28 may use another optimizing method. The parameter calculation unit 28 executes the optimized calculation according to the restraint condition set by the user. Examples of the restraint condition include an operation time of the control target 9 (i.e., a time until the state of the control target 9 reaches a target value from an initial value) and an allowable error related to the operation of the control target 9. The restraint condition may be set according to any policy.

In step S13, the control system 1 outputs a first command that is based on the calculated control parameter to the control target 9. In some examples, the instruction unit 26 transmits control information indicating the control parameter to the controller 3. The controller 3 receives the control information and sets a control parameter. Then, the controller 3 generates the first command based on the control parameter and outputs the first command to the control target 9. In some examples, the controller 3 generates and outputs a command signal indicative of the first command. Thus, the instruction unit 26 causes the controller 3 to output the first command to the control target 9. The first command is a command for operating the control target 9 toward a target value. For example, the instruction unit 26 may transmit the control information indicating the control parameter and the target value to the controller 3, and the controller 3 may receive the control information and set the target value. Alternatively, the instruction unit 26 may acquire the target value based on a predetermined target operation pattern of the driven object 93. Examples of the command signal indicating the first command may include a chirp signal, a multi-sine signal, a pseudo-random signal, a random signal, a short-time irregular signal, and an impulse excitation signal.

In some examples, the controller 3 operates the control target 9 toward a target value by feedback control. In some examples, the controller 3 receives a response value detected by the sensor 94, and calculates a difference between the target value and a current value (current state) of the driven object 93 as the deviation based on the response value. The controller 3 executes a predetermined calculation on the calculated deviation, and determines the first command for reducing the deviation. The predetermined calculation depends on a configuration of the controller 3 (or a method of automatic control). For example, in a case where the PID control such as the cascade control is adopted, the predetermined operation includes a proportional operation, an integral operation, and a differential operation. The controller 3 generates a command signal indicative of the determined first command and outputs the command signal to the control target 9. The controller 3 repeatedly executes the output of the first command that is based on the deviation, at predetermined control cycles, until the control target 9 reaches the target value.

While moving the control target 9 toward the target value, the controller 3 records the response values from the sensor 94 at predetermined control cycles to acquire time-series response data. The controller 3 transmits the time-series response data to the computing device 2.

In step S14, the actual profile calculation unit 23 calculates the first actual response profile. The actual profile calculation unit 23 receives the time-series response data from the controller 3. The actual profile calculation unit 23 then uses the FFT to calculate the first actual response profile from the time-series response data (i.e., from the temporal change in the state of the control target 9). The actual profile calculation unit 23 stores the first actual response profile in the actual profile storage unit 24.

In step S15, the error acquisition unit 25 acquires an error between the first actual response profile and the reference response profile. In some examples, the error acquisition unit 25 calculates a spectral component difference between these two response profiles at each frequency and acquires a set of the differences as the error.

In step S16, the adjustment control unit 29 determines whether the error is less than or equal to a predetermined threshold. In some examples, the adjustment control unit 29 uses a common threshold for all frequencies indicated by the response profile to determine whether there are frequencies for which the spectral difference exceeds the threshold.

In some examples, in a case where the spectral difference is less than or equal to the threshold at all frequencies, the adjustment control unit 29 determines that the error is less than or equal to the threshold (YES in step S16). In this case, the process proceeds to step S22. In step S22, the adjustment control unit 29 determines the control parameter. As a result, the controller 3 is able to output a command to the control target 9 according to the determined control parameter.

In some examples, in a case where there are one or more frequencies where the spectral difference exceeds the threshold, the adjustment control unit 29 determines that the error exceeds the threshold (NO in step S16). The adjustment control unit 29 then determines to perform a series of operations including the update of the mathematical model and the recalculation of the control parameter. By this determination, the process proceeds to step S17.

In step S17, the instruction unit 26 sets a limited band including a frequency corresponding to the error as an identification range. The frequency corresponding to the error refers to a frequency at which the spectral difference exceeds the threshold. In some examples, the frequency corresponding to the error may be a representative frequency among frequencies at which the spectral difference exceeds the threshold. For example, the instruction unit 26 may identify the frequency with the largest spectral difference as the "frequency corresponding to the error". The limited band refers to part of the frequency band indicated by the response profile. The instruction unit 26 may set a fixed range such as 10 Hz or 20 Hz as the identification range. Alternatively, the instruction unit 26 may dynamically set the range of the identification range. In some examples, the instruction unit 26 may set a range including a frequency corresponding to the error and in which the spectral difference continues to exceed the threshold, as the identification range. The instruction unit 26 sets the maximum value of one or more frequencies in which the spectral difference is equal to or less than the threshold, as a lower limit (start point) of the identification range, in a band smaller than the frequency corresponding to the error. Further, the instruction unit 26 sets the minimum value of one or more frequencies in which the spectral difference is equal to or less than the threshold, as an upper limit (end point) of the identification range, in a band larger than the frequency corresponding to the error. By such processing, the instruction unit 26 may identify the range in which the spectral difference continues to exceed the threshold.

In step S18, the control system 1 outputs the second command corresponding to the identification range to the control target 9. In some examples, the instruction unit 26 transmits control information indicative of the identification range to the controller 3. The controller 3 receives the control information and generates the second command based on a frequency component within the identification range. In some examples, the controller 3 generates the second command comprised of the frequency component within the identification range. The controller 3 then outputs the second command to the control target 9. In some examples, the controller 3 generates and outputs a command signal indicative of the second command. Thus, the instruction unit 26 causes the controller 3 to output the second command to the control target 9. The second command may also be referred to as an identification command because it aims to identify a state of the control target 9 corresponding to the identification range. Similar to the first command, the command signal indicating the second command may be a chirp signal, a multi-sine signal, a pseudo-random signal, a random signal, a short-time irregular signal, an impulse excitation signal, or another type of signal. The controller 3 operates the control target 9 toward the target value by feedback control, similar to the control by the first command. During the process, the controller 3 records the response values from the sensor 94 at predetermined control cycles to acquire the time-series response data. The controller 3 transmits the time-series response data to the computing device 2.

In step S19, the actual profile calculation unit 23 calculates the second actual response profile. The actual profile calculation unit 23 receives the time-series response data from the controller 3. The actual profile calculation unit 23 then uses the FFT to calculate the second actual response profile from the time-series response data (i.e., from the temporal change in the state of the control target 9). The actual profile calculation unit 23 stores the second actual response profile in the actual profile storage unit 24.

In step S20, the model update unit 27 updates the mathematical model in the model storage unit 21 based on the reference response profile and the second actual response profile. The model update unit 27 reads the reference response profile from the reference profile storage unit 20 and reads the second actual response profile from the actual profile storage unit 24. The model update unit 27 then replaces a part corresponding to the identification range portion of the reference response profile with the second actual response profile. In some examples, the model update unit 27 replaces the spectral component of the identification range in the reference response profile with the spectral component indicated by the second actual response profile to update the reference response profile. Subsequently, the model update unit 27 generates a mathematical model in which a frequency characteristic is fitted to a gain profile based on the updated reference response profile. The model update unit 27 executes the fitting operation based on the updated reference response profile in the same manner as the initial setting unit 22 to generate the mathematical model. The model update unit 27 stores the updated reference response profile in the reference profile storage unit 20 to update the reference response profile. Also, the model update unit 27 stores the generated mathematical model in the model storage unit 21 as the mathematical model of the updated reference response profile to update the mathematical model in the model storage unit 21.

In step S21, the parameter calculation unit 28 reads the updated mathematical model from the model storage unit 21 and recalculates the control parameter based on that mathematical model. A method of calculating the control parameter is the same as the method of calculating the initial value of the control parameter. Thus, in some examples, the parameter calculation unit 28 executes the H∞ control theory and the optimized calculation corresponding to the theory on the updated mathematical model to calculate the control parameter.

After step S21, the processes after step S13 are repeated. In step S13, the control system 1 outputs a new first command based on the recalculated control parameter, to the control target 9. In step S14, the actual profile calculation unit 23 calculates a new first actual response profile. In step S15, the error acquisition unit 25 acquires an error between the first actual response profile and the updated reference response profile. In step S16, the adjustment control unit 29 again determines whether the error is less than or equal to the threshold.

As shown in the processing flow S1, the control system 1 sets the initial mathematical model and sets the initial value of the control parameter to the controller 3. Subsequently, the control system 1 operates the control target 9 according to the first command based on the control parameter, and identifies a frequency at which a large error occurs between the reference state and the actual state of the control target 9. Subsequently, the control system 1 operates the control target 9 with the second command based on the frequency to acquire the characteristics of the control target 9 more accurately. The control system 1 then updates the mathematical model based on the characteristics, recalculates the control parameter, operates the control target 9 with the new first command, and again evaluates the error. The control system 1 repeats the process of updating the mathematical model and adjusting the control parameter until the control target 9 operates within the allowable error. By this series of processes, the control system 1 automatically designs the controller 3 capable of causing the control target 9 to perform a predetermined action.

Figure 4:
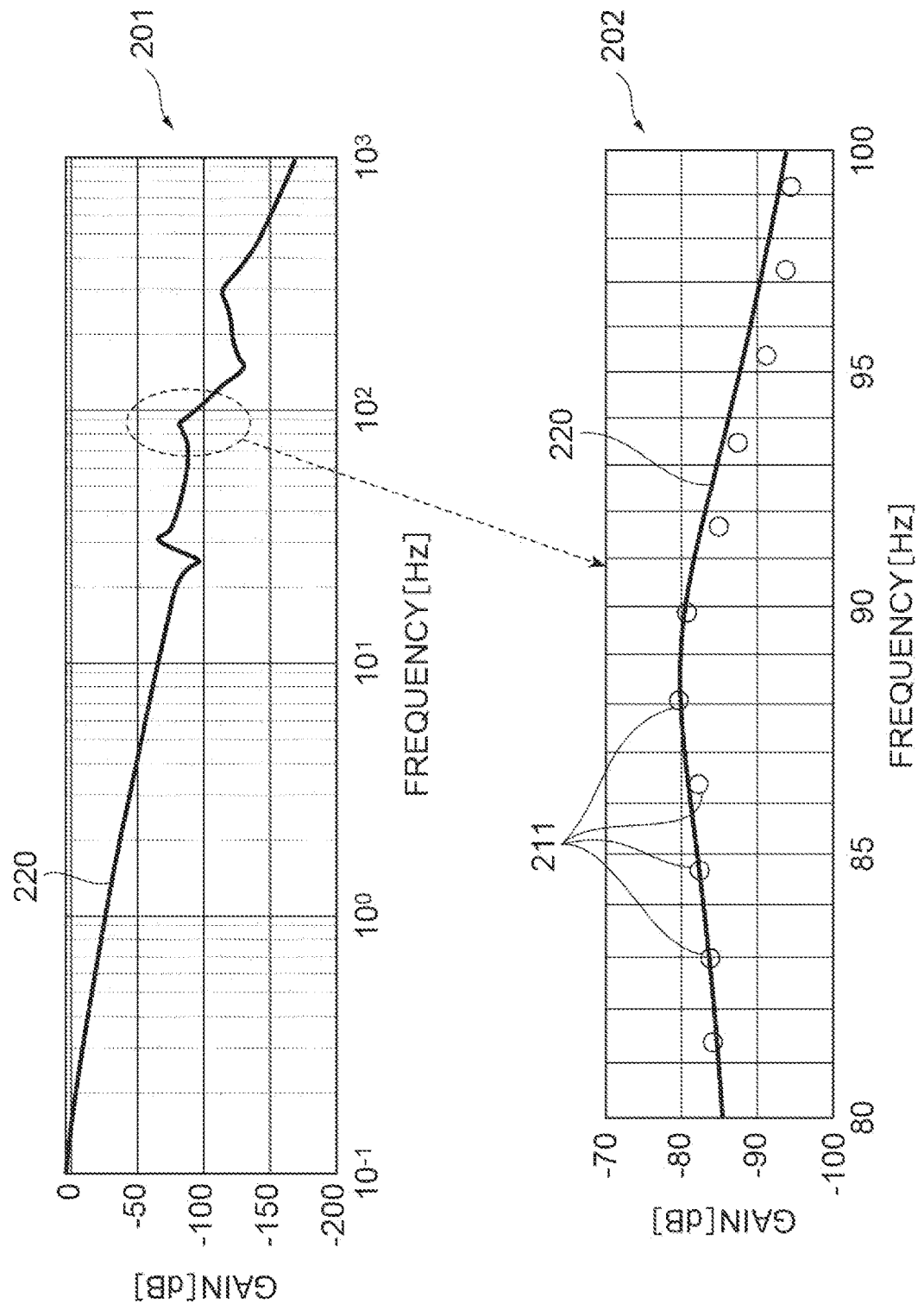
FIG. 4 is a diagram showing an example mathematical model of a reference response profile.
Figure 6:
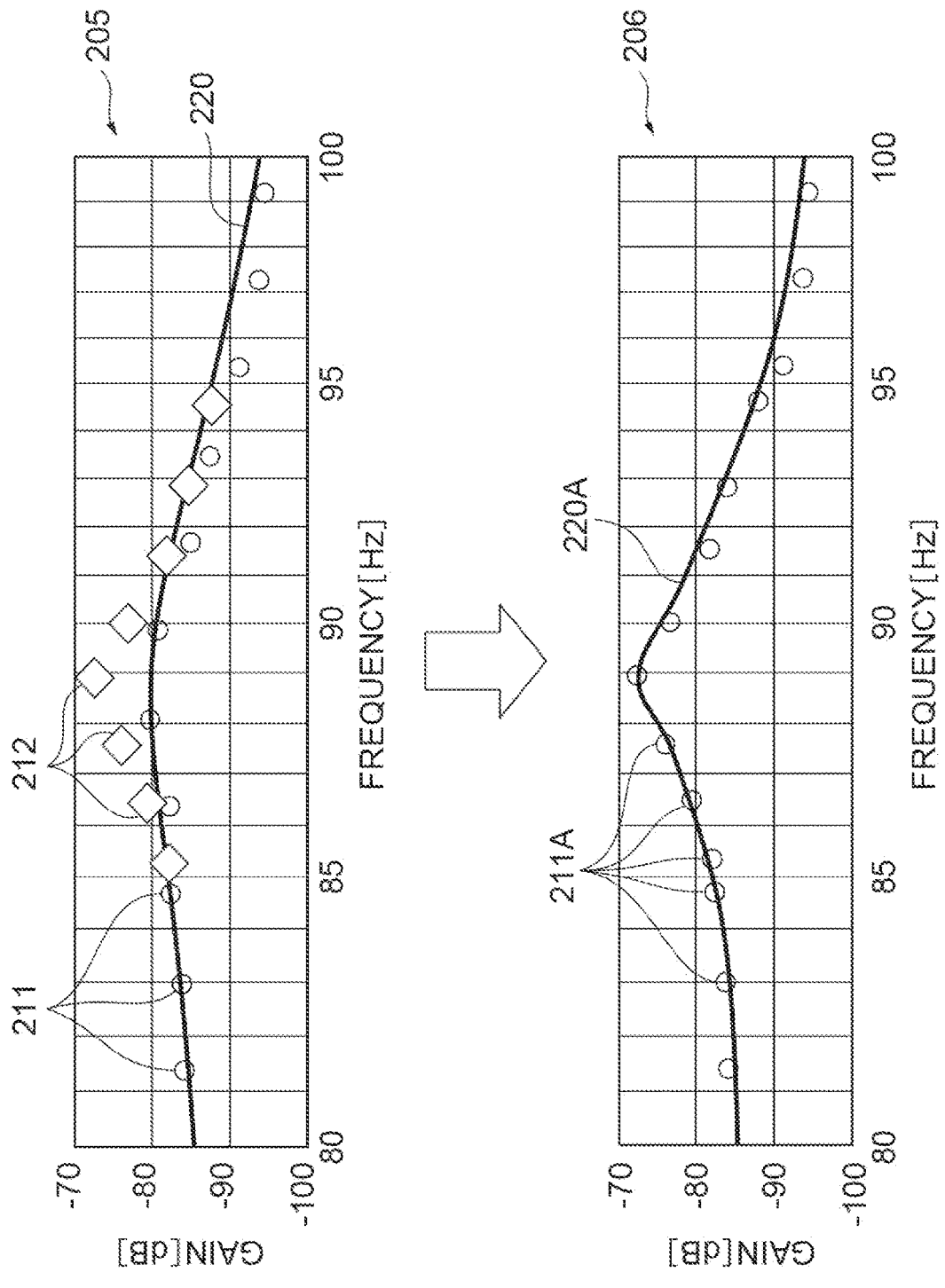
FIG. 6 is a diagram showing an example update of the mathematical model.

An example of updating the mathematical model will be described with reference to FIGS. 4 to 6. In this example, attention is paid to the gain profile. FIG. 4 is a diagram showing an example mathematical model. FIG. 5 is a diagram showing an example error between the first actual response profile and the reference response profile. FIG. 6 is a diagram showing an example of updating the mathematical model based on the error. Both of FIGS. 5 and 6 correspond to FIG. 4.

In FIG. 4, a graph 201 represents a mathematical model 220 acquired by executing the fitting operation based on an initial reference response profile obtained in a band from 0.1 Hz to 1000 Hz. In some examples, the mathematical model 220 is acquired by fitting the frequency characteristics to a gain profile 211 based on the initial reference response profile. A graph 202 shows an enlarged view of a part of the mathematical model 220 from 80 Hz to 100 Hz. The circles in the graph 202 indicate individual discrete values of the gain profile 211.

The parameter calculation unit 28 calculates the initial value of the control parameter based on the mathematical model 220, and the instruction unit 26 causes the controller 3 to output the first command based on the initial value to the control target 9. The actual profile calculation unit 23 executes the FFT on the time-series response data from the control target 9 to calculate the first actual response profile.

It is assumed that a result shown in FIG. 5 is obtained in the series of processes. In FIG. 5, a graph 203 shows time-series response data 231 indicating the reference state of the control target 9 and time-series response data 232 showing the actual state of the control target 9 operated according to first command. In the graph 203, the horizontal axis represents elapsed time, and the vertical axis represents error in the position of the driven object 93. A graph 204 shows an initial reference response profile 241 calculated from the time-series response data 231 and a first actual response profile 242 calculated from the time-series response data 232. In the graph 204, the horizontal axis represents frequency, and the vertical axis represents spectral component. In this example, there is a large difference in spectral component between the band centered at 16.3 Hz and the band centered at 91.9 Hz.

The error acquisition unit 25 acquires the difference between the spectral components as the error. In some examples, the adjustment control unit 29 sets a limited band including 91 9 Hz as the identification range, based on the error. In this example, it is assumed that the adjustment control unit 29 sets the range of 85 Hz to 95 Hz as the identification range. The instruction unit 26 causes the controller 3 to output the second command corresponding to the identification range to the control target 9. The actual profile calculation unit 23 executes the FFT on the time-series response data from the control target 9 to calculate the second actual response profile.

A graph 205 shown in FIG. 6 is obtained by plotting a gain profile 212 based on the second actual response profile on the graph 202 in FIG. 4. In the graph 205, the individual discrete values of the gain profile 212 are indicated by diamond marks. The model update unit 27 replaces a part corresponding to the identification range (85 Hz to 95 Hz) in the reference response profile with the second actual response profile to update the reference response profile. By this update, the part corresponding to the identification range in the gain profile 211 is replaced with the gain profile 212. A graph 206 indicates discrete values of a gain profile 211A updated by the replacement. The model update unit 27 generates a mathematical model 220A with frequency characteristics fitted to the gain profile 212A and stores the mathematical model 220A in the model storage unit 21. By this process, the model update unit 27 updates the mathematical model 220 to the mathematical model 220A. The graph 206 shows the mathematical model 220A limited to the range of 80 Hz to 100 Hz. However, it should be noted that the model update unit 27 generates the mathematical model 220A for the entire frequency band of the reference response profile.

Thereafter, the parameter calculation unit 28 calculates the control parameter based on the mathematical model 220A, and the instruction unit 26 causes the controller 3 to output a new first command based on the control parameter to the control target 9. Based on the error between the updated reference response profile and the first actual response profile of the control target 9 having operated based on the adjusted control parameter, the control system 1 executes a series of processes including the update of the mathematical model and the recalculation of the control parameter or determines the control parameter. The control system 1 executes a number of loop processes and finally determines the control parameter.

As described above, the initial reference response profile may represent the actual state or the virtual state. For example, it is assumed that the initial reference response profile represents frequency characteristics of the actual state at a first time point of the control target 9 corresponding to the first command. The initial mathematical model is generated based on the reference response profile representing the actual state. In this case, it can be said that an error between the reference response profile and the first actual response profile at a second time point after the first time point is caused by the secular change of the control target 9. By adjusting the control parameter so that the error is within the acceptable range, the secular change can be absorbed and the control target 9 can continue to operate properly.

On the other hand, it is assumed that the initial reference response profile represents frequency characteristics of the virtual state of the control target 9 corresponding to the first command. The initial mathematical model is generated based on the reference response profile representing the virtual state. In this case, since the control parameter initially set by the simulation is adjusted so as to match the actual characteristics of the control target 9, the control target 9 can be operated.

Example of Application

The control system 1 may also be applied to a control target having a plurality of motors and in which the driven object includes a plurality of rigid bodies. For example, the control system 1 may also be applied to an articulated robot.

Figure 7:
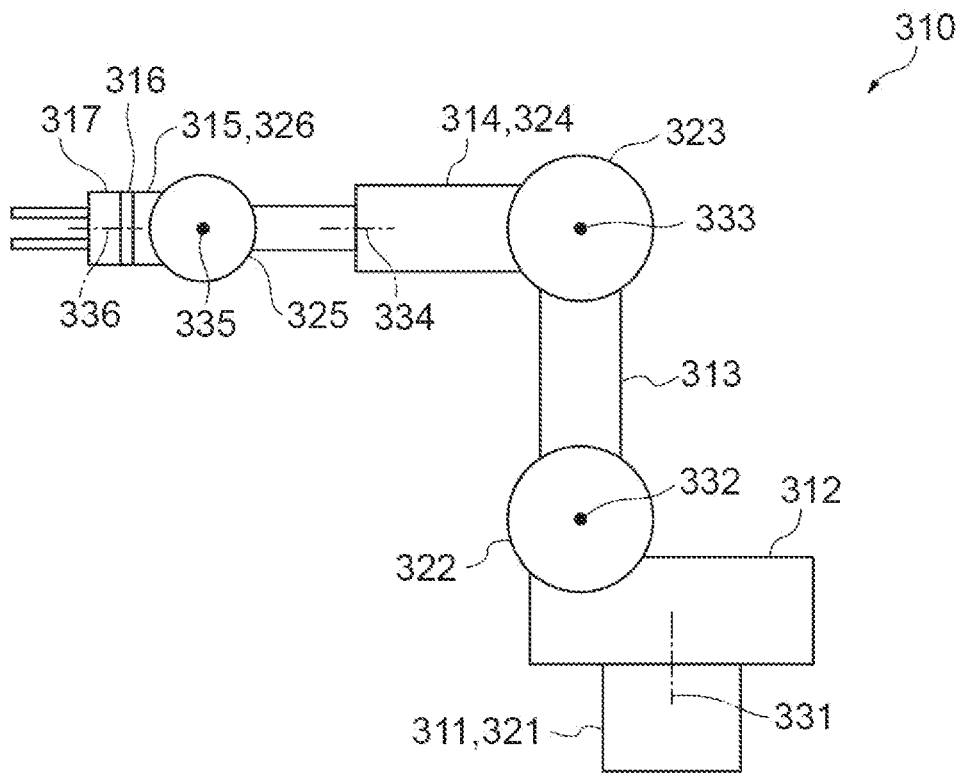
FIG. 7 is a diagram showing an example robot.

FIG. 7 is a diagram showing a robot 310, which is an example of the articulated robot. The robot 310 is a so-called six-axis vertical articulated robot with a base 311, a pivoting portion 312, arms 313, 314, 315, and a tool holding portion 316. The base 311 is fixed on a floor, a table, or an automated guided vehicle (AGV) in the work area. The pivoting portion 312 is mounted on the base 311 so as to pivot about a vertical axis 331.

The arm 313 is connected to the pivoting portion 312 so as to swing about an axis 332 that intersects (e.g., is orthogonal to) the axis 331. The intersection includes a torsion relationship between two axes such as multi-level crossing. The arm 314 is connected to a tip portion of the arm 313 so as to swing about an axis 333 parallel to the axis 332. The arm 315 is connected to a tip portion of the arm 314 so as to rotate about an axis 334 that is along the arm 314 and intersects the axis 333, and to swing about an axis 335 that intersects (e.g., is orthogonal to) the axis 334.

The tool holding portion 316 is connected to a tip portion of the arm 315 so as to pivot about an axis 336 along the center of the arm 315. The tool holding portion 316 holds a tool 317 such as a hand that grip a workpiece, a welding torch, a paint gun, a screwing tool, etc.

A motor 321 pivots the pivoting portion 312 about the axis 331. A motor 322 swings the arm 313 about the axis 332. A motor 323 swings the arm 314 about the axis 333. A motor 324 pivots the tip portion of the arm 314 about the axis 334. A motor 325 swings the arm 315 about the axis 335. A motor 326 pivots the tool holding portion 316 about the axis 336.

In the robot 310, the tool holding portion 316 and the tool 317 are driven objects of the motor 326. The arm 315, the tool holding portion 316, and the tool 317 are driven objects of the motor 325. The tip portion of the arm 314, the arm 315, the tool holding portion 316, and the tool 317 are driven objects of the motor 324. The arms 314, 315, the tool holding portion 316, and the tool 317 are driven objects of the motor 323. The arms 313, 314, 315, the tool holding portion 316, and the tool 317 are driven objects of the motor 322. The pivoting portion 312, the arms 313, 314, 315, the tool holding portion 316, and the tool 317 are driven objects of the motor 321.

In a case where the control target has a plurality of motors as in the robot 310, the control system 1 may execute the processing flow S1 for each motor.

Program

Each functional module of the control system 1 is implemented by reading a control program on the processor 161 or the memory 162 and causing the processor 161 to execute the program. The control program includes code for implementing each functional module of the control system 1. The processor 161 operates the input/output port 164 or the communication port 165 and reads and writes data in the memory 162 or the storage 163, according to the control program. By such processing, each functional module of the control system 1 is realized.

The control program may be provided after being fixedly recorded in a non-transitory recording medium such as a CD-ROM, a DVD-ROM, or a semiconductor memory. Alternatively, the control program may be provided via a communication network as a data signal superimposed on a carrier wave.

As described above, a control system according to an aspect of the present disclosure includes: a controller configured to output a command to a control target; a storage configured to store a computational model of a reference response profile representing, as a reference frequency characteristic, a frequency characteristic of a reference state of the control target corresponding to a first command; and circuitry configured to: calculate a first actual response profile representing, as a first frequency characteristic, a frequency characteristic of a first actual state of the control target having responded to the first command; acquire an error between the reference response profile and the first actual response profile; cause the controller to output, to the control target, a second command that is based on a frequency at which the error is greater than a predetermined threshold; calculate a second actual response profile representing, as a second frequency characteristic, a frequency characteristic of a second actual state of the control target having responded to the second command; and update the computational model based on the second actual response profile and the reference response profile.

A control method according to an aspect of the present disclosure is executable by a control system including a controller configured to output a command to a control target. The method includes: storing, into a storage, a computational model of a reference response profile representing, as a reference frequency characteristic, a frequency characteristic of a reference state of the control target corresponding to a first command; calculating a first actual response profile representing, as a first frequency characteristic, a frequency characteristic of a first actual state of the control target having responded to the first command; acquiring an error between the reference response profile and the first actual response profile; causing the controller to output, to the control target, a second command that is based on a frequency at which the error is greater than a predetermined threshold; calculating a second actual response profile representing, as a second frequency characteristic, a frequency characteristic of a second actual state of the control target having responded to the second command; and updating the computational model based on the second actual response profile and the reference response profile.

Anon-transitory computer-readable storage medium according to an aspect of the present disclosure stores processor-executable instructions to: store, into a storage, a computational model of a reference response profile representing, as a reference frequency characteristic, a frequency characteristic of a reference state of a control target corresponding to a first command; calculate a first actual response profile representing, as a first frequency characteristic, a frequency characteristic of a first actual state of the control target having responded to the first command; acquire an error between the reference response profile and the first actual response profile; cause a controller to output, to the control target, a second command that is based on a frequency at which the error is greater than a predetermined threshold; calculate a second actual response profile representing, as a second frequency characteristic, a frequency characteristic of a second actual state of the control target having responded to the second command; and update the computational model based on the second actual response profile and the reference response profile.

In such aspects, the computational (mathematical) model is automatically updated in consideration of the second actual response obtained by the additional command (second command) based on the error between the reference response and the first actual response. The updated computational model reflects the characteristics of the control target more accurately. Therefore, by using the updated computational model, the command to the control target may be adjusted.

In some examples, the circuitry may be configured to: set, as an identification range, a limited band that is part of a frequency band of the first actual response profile and includes a frequency corresponding to the error; and cause the controller to output the second command based on a frequency component within the identification range to the control target. By generating the second command using the frequency component within the identification range limited to the vicinity of the frequency at which a relatively large error occurs, the second actual response profile corresponding to the error is obtained in detail. The computational model may be updated by using the detailed second actual response profile.

In some examples, the circuitry may be configured to cause the controller to output the second command formed by the frequency component within the identification range to the control target.

In some examples, the circuitry may be configured to calculate a spectral difference at each frequency, the spectral difference being a difference in spectral component between the reference response profile and the first actual response profile, and acquire a set of the spectral difference as the error.

In some examples, the circuitry may be configured to identify a frequency in which the spectral difference is largest as a frequency corresponding to the error.

In some examples, the circuitry may be configured to set, as the identification range, a range which is part of a frequency band of the first actual response profile and includes a frequency corresponding to the error, and the spectral difference continues to exceed a predetermined threshold in the identification range.

In some examples, the circuitry may be configured to: replace a part of the reference response profile corresponding to the identification range with the second actual response profile to update the reference response profile; and execute a fitting operation based on the updated reference response profile to update the computational model. By executing the fitting operation based on the reference response profile with the range in which a relatively large error occurs corrected, the computational model that reflects the characteristics of the control target more accurately may be generated.

In some examples, the circuitry may be configured to replace a spectral component of the identification range in the reference response profile with a spectral component indicated by the second actual response profile to update the reference response profile.

In some examples, the circuitry may be configured to generate the computational model in which the reference frequency characteristic is fitted to a gain profile based on the updated reference response profile.

In some examples, the circuitry may be configured to: recalculate, based on the updated computational model, a control parameter that defines a relationship between the command and an amount of control for causing the control target to follow the command; and cause the controller to output a new command based on the recalculated control parameter to the control target. The control parameter may be recalculated based on the updated computational model in order to output the command to the control target.

In some examples, the circuitry may be configured to execute an H∞ control theory and a corresponding optimization calculation on the updated computational model to recalculate the control parameter. By using the H∞ control theory, a control parameter may be obtained that is robust against uncertainties such as fluctuations in the response of the control target and disturbances. As a result, the robustness of the control system may be improved.

In some examples, the circuitry may be configured to execute the optimization calculation according to a restraint condition including at least one or both of an operation time of the control target and an allowable error related to an operation of the control target.

In some examples, the circuitry may be configured to use linear matrix inequality as the optimization calculation.

In some examples, the circuitry is configured to recalculate gain in cascade control, as the recalculation of the control parameter. By recalculating the gain in cascade control, a command capable of quickly suppressing the influence of disturbance may be generated.

In some examples, the circuitry may be configured to repeatedly execute a process including the output of the second command, the update of the computational model, the recalculation of the control parameter, and the output of the new command, until the error corresponding to the new command becomes equal to or less than the threshold. By such repetitive processing, a command may be generated automatically without a user operation.

In some examples, the storage may be configured to store the computational model of the reference response profile representing a frequency characteristic of an actual state at a first time point of the control target corresponding to the first command, as the reference frequency characteristic. The circuitry may be configured to acquire an error between the reference response profile and the first actual response profile at a second time point later than the first time point. With this mechanism, even if the control target changes over time, the computational model is updated in accordance with the change. By using the updated computational model, the influence of the change may be absorbed and the control target may continue to be operated.

In some examples, the storage may be configured to store the computational model of the reference response profile representing a frequency characteristic of a virtual state of the control target corresponding to the first command, as the reference frequency characteristic. The circuitry may be configured to acquire an error between the reference response profile and the first actual response profile. By this mechanism, the computational model prepared by the simulation is updated based on the actual response of the control target. By using the updated computational model, the control target may be operated based on the actual characteristics of the control target.

In some examples, the control target may include a driven object and a motor that drives the driven object. Each of the first command and the second command may relate to a driving force generated by the motor. Each of the reference state, the first actual state, and the second actual state of the control target may include one or both of a position and a velocity of the driven object. In this case, the command to the motor for setting the position or velocity of the driven object to a predetermined value may be adjusted.

ADDITIONAL EXAMPLES

It is to be understood that not all aspects, advantages and features described herein may necessarily be achieved by, or included in, any one particular example. Indeed, having described and illustrated various examples herein, it should be apparent that other examples may be modified in arrangement and detail.

The controller 3 may include part of the functional modules of the computing device 2. For example, the controller 3 may perform a function equivalent to the actual profile calculation unit 23. The computing device 2 and the controller 3 may be integrated into a single device.

The hardware configuration of the system is not limited to an example in which each functional module is implemented by executing a program. For example, at least part of the functional modules in the above-described examples may be configured by a logic circuit specialized for that part, or may be configured by an application specific integrated circuit (ASIC) in which the logic circuit is integrated.

The processing procedure of the method executed by at least one processor is not limited to the examples above. For example, some of the above-described steps or processes may be omitted, or the steps may be executed in a different order. Further, any two or more steps among the above-described steps may be combined, or part of the steps may be modified or deleted. Alternatively, another step may be executed in addition to the above-described steps.

In a case where a magnitude relationship between two numerical values is compared in the computer system or the computer, either of two criteria of "equal to or greater than" and "greater than" may be used, and either of two criteria of "equal to or less than" and "less than" may be used.

We claim all modifications and variations coming within the spirit and scope of the subject matter claimed herein.

Regarding the above examples, the following appendices are provided by way of further illustration.

(Appendix 1) A control system comprising a controller configured to output a command to a control target, the system comprising:

a storage unit configured to store a mathematical model of a reference response profile representing a frequency characteristic of a reference state of the control target corresponding to a first command;

an error acquisition unit configured to acquire an error between the reference response profile and a first actual response profile representing a frequency characteristic of an actual state of the control target having responded to the first command;

an instruction unit configured to cause the controller to output, to the control target, a second command that is based on a frequency at which the error is greater than a predetermined threshold; and a model update unit configured to update the mathematical model based on a second actual response profile representing a frequency characteristic of an actual state of the control target having responded to the second command, and the reference response profile.

(Appendix 2) A control system according to appendix 1, wherein the instruction unit is configured to:

set, as an identification range, a limited band that is part of a frequency band of the first actual response profile and includes a frequency corresponding to the error; and cause the controller to output the second command based on a frequency component within the identification range to the control target.

(Appendix 3) The control system according to appendix 2, wherein the model update unit is configured to:

replace a part corresponding to the identification range in the reference response profile with the second actual response profile to update the reference response profile; and execute a fitting operation based on the updated reference response profile to update the mathematical model.

(Appendix 4) The control system according to any one of appendices 1 to 3, further comprising parameter calculation unit configured to recalculate, based on the updated mathematical model, a control parameter that defines a relationship between the command and an amount of control for causing the control target to follow the command, wherein the instruction unit is configured to cause the controller to output a new command based on the recalculated control parameter to the control target.

(Appendix 5) The control system according to appendix 4, wherein the parameter calculation unit is configured to execute an H∞ control theory and a corresponding optimization calculation on the updated mathematical model to recalculate the control parameter.

(Appendix 6) The control system according to appendix 4 or 5, wherein the parameter calculation unit is configured to recalculate gain in cascade control, as the recalculation of the control parameter.

(Appendix 7) The control system according to any one of appendices 4 to 6, further comprising an adjustment control unit configured to repeatedly execute a process including the output of the second command, the update of the mathematical model, the recalculation of the control parameter, and the output of the new command, until the error corresponding to the new command becomes equal to or less than the threshold.

(Appendix 8) The control system according to any one of appendices 1 to 7, wherein the storage unit is configured to store the mathematical model of the reference response profile representing a frequency characteristic of an actual state at a first time point of the control target corresponding to the first command, as the frequency characteristic of the reference state, and wherein the error acquisition unit is configured to acquire an error between the reference response profile and the first actual response profile at a second time point later than the first time point.

(Appendix 9) The control system according to any one of appendices 1 to 7, wherein the storage unit is configured to store the mathematical model of the reference response profile representing a frequency characteristic of a virtual state of the control target corresponding to the first command, as the frequency characteristic of the reference state, and wherein the error acquisition unit is configured to acquire an error between the reference response profile and the first actual response profile.

(Appendix 10) The control system according to any one of Appendices 1 to 9, wherein the control target comprises a driven object and a motor that drives the driven object, and wherein each of the first command and the second command relates to a driving force generated by the motor, and each of the reference state and the actual state of the control target is at least one of a position and velocity of the driven object.

(Appendix 11) A control method executed by a control system including a controller configured to output a command to a control target, the method comprising:

storing, in a storage unit, a mathematical model of a reference response profile representing a frequency characteristic of a reference state of the control target corresponding to a first command;

acquiring an error between the reference response profile and a first actual response profile representing a frequency characteristic of an actual state of the control target having responded to the first command;

causing the controller to output, to the control target, a second command that is based on a frequency at which the error is greater than a predetermined threshold; and updating the mathematical model based on a second actual response profile representing a frequency characteristic of an actual state of the control target having responded to the second command, and the reference response profile.

(Appendix 12) A computer comprising:

a storage unit configured to store a mathematical model of a reference response profile representing a frequency characteristic of a reference state of a control target corresponding to a first command output to the control target;

an error acquisition unit configured to acquire an error between the reference response profile and a first actual response profile representing a frequency characteristic of an actual state of the control target having responded to the first command; and a model update unit configured to update the mathematical model based on a second actual response profile representing a frequency characteristic of an actual state of the control target having responded to a second command that is based on a frequency at which the error is greater than a predetermined threshold, and the reference response profile.

(Appendix 13) A control program causing a computer to execute:

storing, in a storage unit, a mathematical model of a reference response profile representing a frequency characteristic of a reference state of a control target corresponding to a first command output to the control target;

acquiring an error between the reference response profile and a first actual response profile representing a frequency characteristic of an actual state of the control target having responded to the first command; and updating the mathematical model based on a second actual response profile representing a frequency characteristic of an actual state of the control target having responded to a second command that is based on a frequency at which the error is greater than a predetermined threshold, and the reference response profile.

What is claimed is:

1. A control system comprising:

a controller configured to output a command to a control target;

a storage configured to store a computational model of a reference response profile representing, as a reference frequency characteristic, a frequency characteristic of a reference state of the control target corresponding to a first command; and circuitry configured to:

calculate a first actual response profile representing, as a first frequency characteristic, a frequency characteristic of a first actual state of the control target having responded to the first command;

acquire an error between the reference response profile and the first actual response profile;

set, as an identification range, a limited band that is part of a frequency band of the first actual response profile and includes a frequency corresponding to the error;

cause the controller to output, to the control target, a second command that is based on a frequency at which the error is greater than a predetermined threshold, wherein the second command is based further on a frequency component within the identification range;

calculate a second actual response profile representing, as a second frequency characteristic, a frequency characteristic of a second actual state of the control target having responded to the second command;

replace a part of the reference response profile corresponding to the identification range with the second actual response profile to update the reference response profile; and execute a fitting operation based on the updated reference response profile to update the computational model.

2. The control system according to claim 1, wherein the circuitry is configured to cause the controller to output the second command formed by the frequency component within the identification range to the control target.

3. The control system according to claim 1, wherein the circuitry is configured to:

calculate a spectral difference at each frequency, the spectral difference being a difference in spectral component between the reference response profile and the first actual response profile; and acquire a set of the spectral difference as the error.

4. The control system according to claim 3, wherein the circuitry is configured to identify a frequency in which the spectral difference is largest as a frequency corresponding to the error.

5. The control system according to claim 3, wherein the circuitry is configured to set, as the identification range, a range which is part of a frequency band of the first actual response profile and includes a frequency corresponding to the error, and wherein the spectral difference continues to exceed a predetermined threshold in the identification range.

6. The control system according to claim 1, wherein the circuitry is configured to replace a spectral component of the identification range in the reference response profile with a spectral component indicated by the second actual response profile to update the reference response profile.

7. The control system according to claim 1, wherein the circuitry is configured to generate the computational model in which the reference frequency characteristic is fitted to a gain profile based on the updated reference response profile.

8. The control system according to claim 1, wherein the circuitry is configured to:

recalculate, based on the updated computational model, a control parameter that defines a relationship between the command and an amount of control for causing the control target to follow the command; and cause the controller to output a new command based on the recalculated control parameter to the control target.

9. The control system according to claim 8, wherein the circuitry is configured to execute an H-infinity control theory and a corresponding optimization calculation on the updated computational model to recalculate the control parameter.

10. The control system according to claim 9, wherein the circuitry is configured to execute the optimization calculation according to a restraint condition including one or both of an operation time of the control target and an allowable error related to an operation of the control target.

11. The control system according to claim 9, wherein the circuitry is configured to use linear matrix inequality as the optimization calculation.

12. The control system according to claim 8, wherein the circuitry is configured to recalculate gain in cascade control, as the recalculation of the control parameter.

13. The control system according to claim 8, wherein the circuitry is configured to repeatedly execute a process including the output of the second command, the update of the computational model, the recalculation of the control parameter, and the output of the new command, until the error corresponding to the new command becomes equal to or less than the threshold.

14. The control system according to claim 1, wherein the storage is configured to store the computational model of the reference response profile representing a frequency characteristic of an actual state at a first time point of the control target corresponding to the first command, as the reference frequency characteristic, and wherein the circuitry is configured to acquire an error between the reference response profile and the first actual response profile at a second time point later than the first time point.

15. The control system according to claim 1, wherein the storage is configured to store the computational model of the reference response profile representing a frequency characteristic of a virtual state of the control target corresponding to the first command, as the reference frequency characteristic, and wherein the circuitry is configured to acquire an error between the reference response profile and the first actual response profile.

16. The control system according to claim 1, wherein the control target comprises a driven object and a motor that drives the driven object, and wherein each of the first command and the second command relates to a driving force generated by the motor, and wherein each of the reference state, the first actual state, and the second actual state of the control target indicates one or both of a position and a velocity of the driven object.

17. A control method executable by a control system including a controller configured to output a command to a control target, the method comprising:

storing, into a storage, a computational model of a reference response profile representing, as a reference frequency characteristic, a frequency characteristic of a reference state of the control target corresponding to a first command;

calculating a first actual response profile representing, as a first frequency characteristic, a frequency characteristic of a first actual state of the control target having responded to the first command;

acquiring an error between the reference response profile and the first actual response profile;

setting, as an identification range, a limited band that is part of a frequency band of the first actual response profile and includes a frequency corresponding to the error;

causing the controller to output, to the control target, a second command that is based on a frequency at which the error is greater than a predetermined threshold, wherein the second command is based further on a frequency component within the identification range;

calculating a second actual response profile representing, as a second frequency characteristic, a frequency characteristic of a second actual state of the control target having responded to the second command;

replacing a part of the reference response profile corresponding to the identification range with the second actual response profile to update the reference response profile; and executing a fitting operation based on the updated reference response profile to update the computational model.

18. A non-transitory computer-readable storage medium storing processor-executable instructions to:

store, into a storage, a computational model of a reference response profile representing, as a reference frequency characteristic, a frequency characteristic of a reference state of a control target corresponding to a first command;

calculate a first actual response profile representing, as a first frequency characteristic, a frequency characteristic of a first actual state of the control target having responded to the first command;

acquire an error between the reference response profile and the first actual response profile;

set, as an identification range, a limited band that is part of a frequency band of the first actual response profile and includes a frequency corresponding to the error;

cause a controller to output, to the control target, a second command that is based on a frequency at which the error is greater than a predetermined threshold, wherein the second command is based further on a frequency component within the identification range;

calculate a second actual response profile representing, as a second frequency characteristic, a frequency characteristic of a second actual state of the control target having responded to the second command;

replace a part of the reference response profile corresponding to the identification range with the second actual response profile to update the reference response profile; and execute a fitting operation based on the updated reference response profile to update the computational model.

\* \* \* \* \*